United States Patent
Chen et al.

(10) Patent No.: US 10,951,741 B2
(45) Date of Patent: Mar. 16, 2021

(54) COMPUTER DEVICE AND METHOD FOR READING OR WRITING DATA BY COMPUTER DEVICE

(71) Applicant: HUAWEI TECHNOLOGIES CO., LTD., Guangdong (CN)

(72) Inventors: Yun Chen, Hangzhou (CN); Haibin Wang, Hangzhou (CN); Xiongli Gu, Hangzhou (CN); Xiaosong Cui, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 15/874,852

(22) Filed: Jan. 18, 2018

(65) Prior Publication Data

US 2018/0159963 A1 Jun. 7, 2018

Related U.S. Application Data

(63) Continuation of application No. PCT/CN2015/084816, filed on Jul. 22, 2015.

(51) Int. Cl.
*H04L 29/06* (2006.01)
*G06F 1/16* (2006.01)
(Continued)

(52) U.S. Cl.
CPC ............... *H04L 69/10* (2013.01); *G06F 1/16* (2013.01); *G06F 3/061* (2013.01); *G06F 3/067* (2013.01);
(Continued)

(58) Field of Classification Search
CPC . H04L 69/02; H04L 69/10; G06F 1/16; G06F 3/061; G06F 3/0611; G06F 3/067; G06F 3/0659; G06F 13/32
See application file for complete search history.

(56) References Cited

U.S. PATENT DOCUMENTS 7,010,575 B1 3/2006 MacArthur et al.
8,751,714 B2 6/2014 Safranek et al.
(Continued)

FOREIGN PATENT DOCUMENTS

CN 202178776 U 3/2012
CN 103414764 A 11/2013
(Continued)

OTHER PUBLICATIONS

PCI Express® Base Specification Revision 3.0, Nov. 10, 2010. total 860 pages.
(Continued)

*Primary Examiner* — Azizul Choudhury
(74) *Attorney, Agent, or Firm* — Kilpatrick Townsend & Stockton LLP (57) ABSTRACT

A computer device and a method for reading or writing data by a computer device are provided. In the computer device, a central processing unit (CPU) is connected to a cloud controller using a double data rate (DDR) interface. Because the DDR interface has a high data transmission rate, interruption of CPU can be avoided. In addition, the CPU converts a read or write operation request into a control command and writes the control command into a transmission queue in the cloud controller. Because the cloud controller performs a read operation or a write operation on a network device according to operation information in the control command, after writing the control command into the transmission queue, the CPU does not need to wait for an operation performed by the cloud controller and can continue to perform other processes.

20 Claims, 5 Drawing Sheets

(51) Int. Cl.
 G06F 3/06 (2006.01)
 G06F 13/32 (2006.01)
(52) U.S. Cl.
 CPC .......... *G06F 3/0611* (2013.01); *G06F 3/0659* (2013.01); *G06F 13/32* (2013.01); *H04L 69/02* (2013.01)

(56) References Cited

U.S. PATENT DOCUMENTS

| | | | |
|---|---|---|---|
| 8,831,000 B2* | 9/2014 | Mishra | H04L 12/185 370/390 |
| 8,874,836 B1 | 10/2014 | Hayes et al. | |
| 9,215,229 B2* | 12/2015 | Eicken | H04L 67/1097 |
| 9,736,267 B2* | 8/2017 | Seago | H04L 67/32 |
| 10,445,121 B2* | 10/2019 | McLeod | G06F 9/45558 |
| 2007/0162658 A1 | 7/2007 | Furukawa et al. | |
| 2007/0168559 A1 | 7/2007 | Tanaka et al. | |
| 2008/0228960 A1 | 9/2008 | Nakatsuka | |
| 2009/0248857 A1 | 10/2009 | Murakami | |
| 2011/0219145 A1 | 9/2011 | Pope et al. | |
| 2012/0047107 A1* | 2/2012 | Doddavula | G06F 9/5083 707/620 |
| 2012/0066449 A1 | 3/2012 | Colgrove et al. | |
| 2013/0227089 A1 | 8/2013 | Mcleod et al. | |
| 2014/0059542 A1 | 2/2014 | Ashok et al. | |
| 2014/0101300 A1 | 4/2014 | Rosensweig et al. | |
| 2014/0172783 A1* | 6/2014 | Suzuki | G06F 8/63 707/609 |
| 2014/0223071 A1 | 8/2014 | Bert et al. | |
| 2014/0281708 A1* | 9/2014 | Adam | G06F 11/1443 714/18 |
| 2014/0330957 A1 | 11/2014 | Ying et al. | |

FOREIGN PATENT DOCUMENTS

| | | |
|---|---|---|
| CN | 104429045 A | 3/2015 |
| CN | 104704470 A | 6/2015 |
| JP | 2001325158 A | 11/2001 |
| JP | 2004220216 A | 8/2004 |
| JP | 2005165439 A | 3/2005 |
| JP | 2005539305 A | 12/2005 |
| JP | 2007027951 A | 2/2007 |
| JP | 2008226040 A | 9/2008 |
| JP | 2009238098 A | 10/2009 |
| JP | 2014154155 A | 8/2014 |
| WO | 2015095832 A1 | 6/2015 |

OTHER PUBLICATIONS

Robert Safranek, Intel® QuickPath Interconnect Overview, Intel Corporation. 2009. total 27 pages.
Intel QuickPath Interconnect, Wikipedia, https://en.wikipedia.org/wiki/Intel_QuickPathInterconnect. Retrieved from the internet on Jan. 24, 2018. total 4 pages.
Neal Oliver, A Reconfigurable Computing System Based on a Cache-Coherent Fabric, Intel Corporation. Jun. 10, 2012. total 15 pages.
Clabby Analytics, Infrastructure Matters: "POWER8 vs. Xeon x86",Jun. 2014. total 7 pages.
POWER8 Coherent Accelerator Processor Interface (CAPI). Retrieved from the internet: https://developer.ibm.com/linuxonpower/capi/, Feb. 2, 2018. total 2 pages.
Bruce Wile, Coherent Accelerator Processor Interface (CAPI) for POWER8 Systems, White Paper. IBM Systems and Technology Group. Sep. 29, 2014. total 13 pages.
Technical White Paper, High Throughput Computing Data Center Architecture, Thinking of Data Center 3.0, Jun. 2014. total 8 pages.

* cited by examiner

| A CPU converts a request for performing a read/write operation on a network device into a control command, and writes the control command into a transmission queue module of a cloud controller, where the control command is used to instruct the cloud controller to perform a read operation or a write operation on the network device, and the control command carries operation information of the read operation or the write operation | ⟵ 500 |

| The cloud controller performs the read operation or the write operation on the network device according to the operation information in the control command when the control command in the transmission queue module is triggered, and writes a response message sent by the network device into a response queue module of the cloud controller when receiving the response message sent by the network device | ⟵ 502 |

FIG. 5

COMPUTER DEVICE AND METHOD FOR READING OR WRITING DATA BY COMPUTER DEVICE

CROSS-REFERENCE TO RELATED APPLICATIONS

This application is a continuation of International Application No. PCT/CN2015/084816, filed on Jul. 22, 2015, the disclosure of which is hereby incorporated by reference in its entirety.

TECHNICAL FIELD

The present application relates to the field of information technologies, and in particular, to a computer device and a method for reading/writing data by a computer device.

BACKGROUND

With development of data centers and approaching of the era of big data, data center architecture has developed from a tightly coupled silo-like server architecture into a virtualization-technology-centered architecture. To adapt to the coming era of big data, existing data centers are faced with a series of challenges in future big data processing. The challenges include P bits/second real-time data processing, dynamic resource allocation and adjustment on demand, energy efficiency improvement of a large-scale system, etc. In response, high-throughput computer data centers with features such as resource pooling, hardware decoupling, and silicon photonic interconnection come into being.

In an architecture of a high-throughput computer data center, pooling of memory resources, input/output resources, or the like are implemented. A high-throughput computing node is connected to a memory resource pool or an input/output resource pool using a network, so as to dynamically allocate and adjust resources and improve system energy efficiency. Due to the resource pooling, hardware decoupling makes an interconnect technology, for example, silicon photonic interconnection, a most crucial technology. A current data center level interconnect technology relies mainly on Ethernet interconnect technology. However, due to a complex and bloated protocol stack and an extremely high interconnect delay of the Ethernet itself, the interconnect technology becomes less capable of meeting requirements of a data center on quick and high-capacity data exchange. On the other hand, simplified Pooled Resource Access Protocol (PRAP) that can provide high bandwidth and low delay can meet the low delay requirement of high-throughput computer data centers.

In a current method for decoupling a built high-throughput computer, a cloud controller is used as a key module for the interconnection. The PRAP interconnect protocol is used to connect a computing pool, a remote memory resource pool, an input/output (I/O) resource pool, and the like, and a double data rate (DDR) interface is used to connect to a central processing unit (CPU). However, when data in the remote memory resource pool or input/output resource pool needs to be read, due to a network delay, the cloud controller cannot return requested data at the DDR interface within a specified time. Therefore, when a CPU of a high-throughput computer accesses the remote memory resource pool or input/output resource pool using a network, an interrupt of the CPU is caused, leading to a high access delay and a problem that overall performance of a system is affected because the CPU cannot perform another operation during the interrupt.

SUMMARY

Embodiments of the present application provide a computer device and a method for reading or writing data by a computer device, so as to resolve an existing problem that system performance is affected due to a high delay when a CPU of a computer device reads or writes remote data.

To achieve the foregoing objective, a first aspect of the embodiments of the present application provides a computer device, including a central processing unit (CPU) and a cloud controller, where the cloud controller includes a transmission queue module, a response queue module, a double data rate (DDR) interface, and a network interface, the DDR interface is configured to connect the CPU to the cloud controller, and the network interface is configured to connect the cloud controller to a network device;

the CPU is configured to: after generating a request for performing a read or write operation on the network device, convert the read or write operation request into a control command, and write the control command into the transmission queue module, where the control command is used to instruct the cloud controller to perform a read operation or a write operation on the network device, and the control command carries operation information of the read operation or the write operation; and the cloud controller is configured to: perform the read operation or the write operation on the network device according to the operation information in the control command when the control command in the transmission queue module is triggered, receive a response message sent by the network device, and write the response message sent by the network device into the response queue module.

With reference to the first aspect, in a first possible implementation of the first aspect of the embodiments of the present application, the read or write operation request is a read operation request;

the transmission queue module includes a command transmission queue module and a data transmission queue module;

the response queue module includes a response command queue module and a data receiving queue module;

the CPU is further configured to: convert the read operation request into a read control command, and write the read control command into the command transmission queue module, where the read control command carries read operation information and is used to instruct the cloud controller to perform a read operation on the network device according to the read operation information; and the cloud controller is further configured to: perform the read operation on the network device according to the read operation information in the read control command when the read control command in the command transmission queue module is triggered, receive a read response message sent by the network device, write the read response message sent by the network device into the response command queue module, and write, into the data receiving queue module, data that is to be read by means of the read operation and that is returned by the network device.

With reference to the first possible implementation of the first aspect of the embodiments of the present application, in a second possible implementation of the first aspect of the embodiments of the present application, the read operation information includes an address, in the network device, of the data to be read by means of the read operation and a length of the data to be read by means of the read operation; or the read operation information includes a node address and an offset address, in the network device, of the data to be read by means of the read operation and a length of the data to be read by means of the read operation.

With reference to the first possible implementation or the second possible implementation of the first aspect of the embodiments of the present application, in a third possible implementation of the first aspect of the embodiments of the present application, the CPU is further configured to: after writing the read control command into the command transmission queue module, query, in a polling manner, whether the read response message sent by the network device exists in the response command queue module, and read, from the data receiving queue module, the data to be read by means of the read operation when the CPU determines that the read response message sent by the network device exists in the response command queue module and the read response message is a read success response message.

With reference to the first possible implementation or the second possible implementation of the first aspect of the embodiments of the present application, in a fourth possible implementation of the first aspect of the embodiments of the present application, the cloud controller is further configured to: determine whether the read response message sent by the network device exists in the response command queue module, and notify the CPU by means of an interrupt when the read response message sent by the network device exists in the response command queue module; and the CPU is further configured to: receive an interrupt message sent by the cloud controller, obtain the read response message from the response command queue module according to the interrupt message, and read, from the data receiving queue module, the data to be read by means of the read operation when the obtained read response message indicates a read success.

With reference to the first aspect of the embodiments of the present application, in a fifth possible implementation of the first aspect of the embodiments of the present application, the read or write operation request is a write operation request;

the transmission queue module includes a command transmission queue module and a data transmission queue module;

the response queue module includes a response command queue module and a data receiving queue module;

the CPU is further configured to: convert the write operation request into a write control command, write the write control command into the command transmission queue module, and write, into the data transmission queue module, data to be written by means of the write operation, where the write control command carries write operation information and is used to instruct the cloud controller to write, into the network device according to the write operation information, the data to be written by means of the write operation; and the cloud controller is further configured to: extract, from the data transmission queue module according to the write operation information in the write control command when the write control command in the command transmission queue module is triggered, the data to be written by means of the write operation, and write, into the network device, the data to be written by means of the write operation; and write the write response message sent by the network device into the response command queue module when receiving a write response message sent by the network device.

With reference to the fifth possible implementation of the first aspect of the embodiments of the present application, in a sixth possible implementation of the first aspect of the embodiments of the present application, the write operation information includes an address of the network device, a length of the data to be written by means of the write operation, and an address, in the data transmission queue module, of the data to be written by means of the write operation; or the write operation information includes a node address and an offset address of the network device, a length of the data to be written by means of the write operation, and an address, in the data transmission queue module, of the data to be written by means of the write operation.

With reference to the fifth possible implementation or the sixth possible implementation of the first aspect of the embodiments of the present application, in a seventh possible implementation of the first aspect of the embodiments of the present application, the CPU is further configured to: after writing the write control command into the command transmission queue module, query, in a polling manner, whether the write response message sent by the network device exists in the response command queue module, and obtain the write response message when the CPU determines that the write response message sent by the network device exists in the response command queue module.

With reference to the fifth possible implementation or the sixth possible implementation of the first aspect of the embodiments of the present application, in an eighth possible implementation of the first aspect of the embodiments of the present application, the cloud controller is further configured to: determine whether the write response message sent by the network device exists in the response command queue module, and notify the CPU by means of an interrupt when the write response message sent by the network device exists in the response command queue module; and the CPU is further configured to: receive an interrupt message sent by the cloud controller, and obtain the write response message from the response command queue module according to the interrupt message.

A second aspect of the embodiments of the present application further provides application a method for reading or writing data by a computer device, where the computer device includes a central processing unit (CPU), a cloud controller, and a network interface, the CPU is connected to the cloud controller using a double data rate (DDR) interface, and the network interface is configured to connect the cloud controller to a network device; and the method includes:

converting, by the CPU, a request for performing a read or write operation on the network device into a control command, and writing the control command into a transmission queue module of the cloud controller, where the control command is used to instruct the cloud controller to perform a read operation or a write operation on the network device, and the control command carries operation information of the read operation or the write operation; and performing, by the cloud controller, the read operation or the write operation on the network device according to the operation information in the control command when the control command in the transmission queue module is triggered, and writing a response message sent by the network device into a response queue module of the cloud controller when receiving the response message sent by the network device.

With reference to the second aspect, in a first possible implementation of the second aspect of the embodiments of the present application, the read or write operation request is a read operation request;

correspondingly, the converting, by the CPU, a request for performing a read or write operation on the network device into a control command, and writing the control command into a transmission queue module of the cloud controller includes:

converting, by the CPU, the read operation request into a read control command, and writing the read control command into a command transmission queue module of the transmission queue module, where the read control command carries read operation information and is used to instruct the cloud controller to perform a read operation on the network device according to the read operation information; and the performing, by the cloud controller, the read operation or the write operation on the network device according to the operation information in the control command, and writing a response message sent by the network device into a response queue module of the cloud controller when receiving the response message sent by the network device includes:

performing, by the cloud controller, the read operation on the network device according to the read operation information in the read control command when the read control command in the command transmission queue module is triggered, receiving a read response message sent by the network device, writing the read response message sent by the network device into the response command queue module of the response queue module, and writing, into the data receiving queue module of the response queue module, data that is to be read by means of the read operation and that is returned by the network device.

With reference to the first possible implementation of the second aspect of the embodiments of the present application, in a second possible implementation of the second aspect of the embodiments of the present application, the read operation information includes an address, in the network device, of the data to be read by means of the read operation and a length of the data to be read by means of the read operation; or the read operation information includes a node address and an offset address, in the network device, of the data to be read by means of the read operation and a length of the data to be read by means of the read operation.

With reference to the first possible implementation or the second possible implementation of the second aspect of the embodiments of the present application, in a third possible implementation of the second aspect of the embodiments of the present application, after writing the read control command into the command transmission queue module, querying, by the CPU in a polling manner, whether the read response message sent by the network device exists in the response command queue module, and reading, from the data receiving queue module, the data to be read by means of the read operation when the CPU determines that the read response message sent by the network device exists in the response command queue module and the read response message is a read success response message.

With reference to the first possible implementation or the second possible implementation of the second aspect of the embodiments of the present application, in a fourth possible implementation of the second aspect of the embodiments of the present application, determining, by the cloud controller, whether the read response message sent by the network device exists in the response command queue module, and notifying the CPU by means of an interrupt when the read response message sent by the network device exists in the response command queue module; and receiving, by the CPU, an interrupt message sent by the cloud controller, obtaining the read response message from the response command queue module according to the interrupt message, and when the obtained read response message indicates a read success, reading, from the data receiving queue module, the data to be read by means of the read operation.

With reference to the second aspect of the embodiments of the present application, in a fifth possible implementation of the second aspect of the embodiments of the present application, the read or write operation request is a write operation request;

correspondingly, the converting, by the CPU, a request for performing a read or write operation on the network device into a control command, and writing the control command into a transmission queue module of the cloud controller includes:

converting, by the CPU, the write operation request into a write control command, writing the write control command into the command transmission queue module of the transmission queue module, and writing, into the data transmission queue module of the transmission queue module, data to be written by means of the write operation, where the write control command carries write operation information and is used to instruct the cloud controller to write, into the network device according to the write operation information, the data to be written by means of the write operation; and the performing, by the cloud controller, the read operation or the write operation on the network device according to the operation information in the control command, and writing a response message sent by the network device into a response queue module of the cloud controller when receiving the response message sent by the network device includes:

extracting, by the cloud controller from the data transmission queue module according to the write operation information in the write control command when the write control command in the command transmission queue module is triggered, the data to be written by means of the write operation, and writing, into the network device, the data to be written by means of the write operation; and writing the write response message sent by the network device into the response command queue module of the response queue module when receiving a write response message sent by the network device.

With reference to the fifth possible implementation of the second aspect of the embodiments of the present application, in a sixth possible implementation of the second aspect of the embodiments of the present application, the write operation information includes an address of the network device, a length of the data to be written by means of the write operation, and an address, in the data transmission queue module, of the data to be written by means of the write operation; or the write operation information includes a node address and an offset address of the network device, a length of the data to be written by means of the write operation, and an address, in the data transmission queue module, of the data to be written by means of the write operation.

With reference to the fifth possible implementation or the sixth possible implementation of the second aspect of the embodiments of the present application, in a seventh possible implementation of the second aspect of the embodiments of the present application, the method further includes:

after writing the write control command into the command transmission queue module, querying, by the CPU in a polling manner, whether the write response message sent by the network device exists in the response command queue module, and obtaining the write response message when the CPU determines that the write response message sent by the network device exists in the response command queue module.

With reference to the fifth possible implementation or the sixth possible implementation of the second aspect of the embodiments of the present application, in an eighth possible implementation of the second aspect of the embodiments of the present application, the method further includes:

determining, by the cloud controller, whether the write response message sent by the network device exists in the response command queue module, and notifying the CPU by means of an interrupt when the write response message sent by the network device exists in the response command queue module; and receiving, by the CPU, an interrupt message sent by the cloud controller, and obtaining the write response message from the response command queue module according to the interrupt message.

According to the computer device and the method for reading or writing data by a computer device that are provided in the embodiments of the present application, a CPU of the computer device is connected to a cloud controller using a DDR interface, and an interrupt is avoided because the DDR interface has a high data transmission rate. In addition, the CPU converts a read or write operation request into a control command and writes the control command into a transmission queue module of the cloud controller. Because the cloud controller performs a read operation or a write operation on a network device according to operation information in the control command, after writing the control command into the transmission queue module, the CPU does not need to wait for an operation performed by the cloud controller and can continue to perform other service processing, for example, continue to write another control command. This avoids a waste of CPU resources, and improves CPU utilization and overall performance of a system.

DESCRIPTION OF EMBODIMENTS

Figure 1:
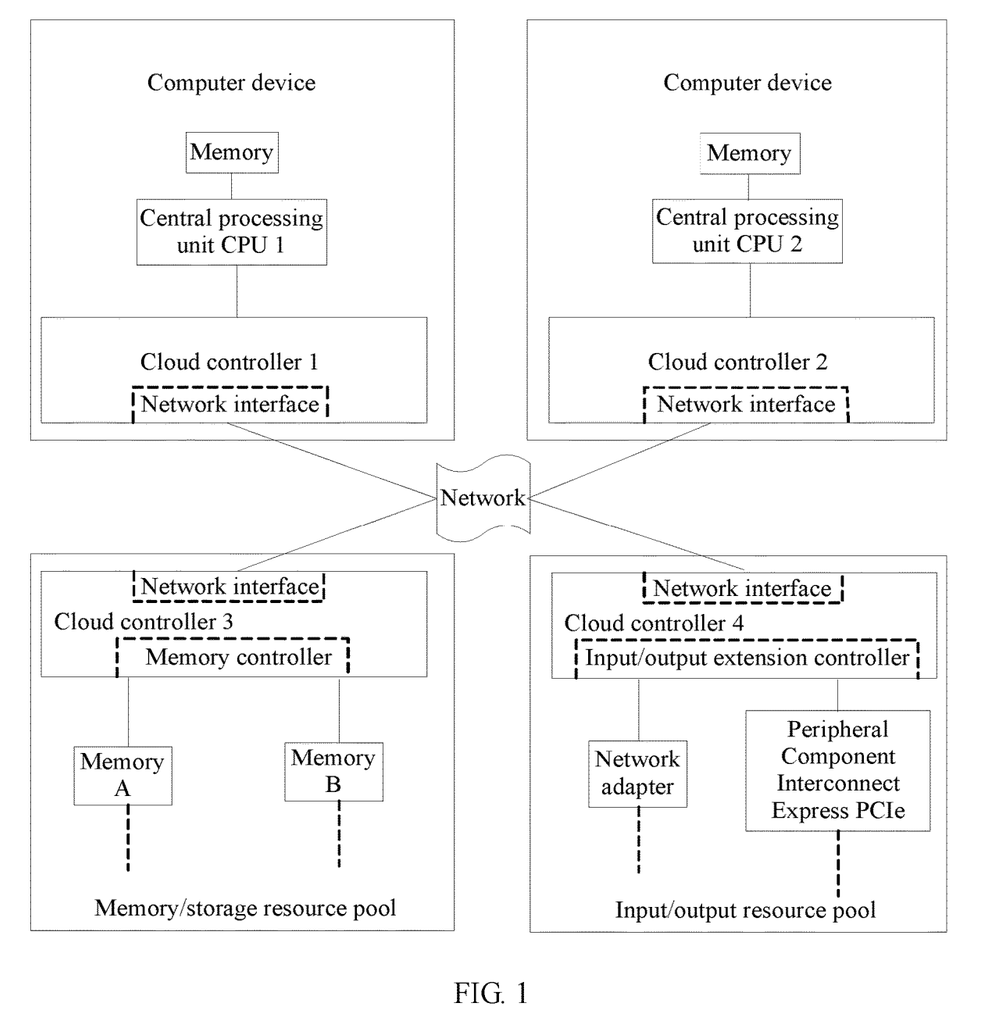
FIG. 1 is a schematic architecture diagram of a implementation of a high-throughput computer data center.

FIG. 1 is a schematic architecture diagram of an implementation of a high-throughput computer data center. A computer device includes a central processing unit (CPU), a memory, and a cloud controller. The cloud controller is connected to a remote resource pool using a network. The remote resource pool includes storage resources, input/output resources, or the like. The storage resources, for example, dynamic random access memories (DRAMs) and non-volatile memories (NVMs) form a storage resource pool. The input/output resources, for example, network adapters and Peripheral Component Interconnect Express (PCIe) interfaces, form an input/output resource pool. It should be noted that FIG. 1 shows merely an example of a structural diagram of a high-throughput computer data center. During implementation, other hardware resources (for example, a bus), other resource pools (for example, a computing resource pool), or the like may be further included. In addition, in a computer device, multiple central processing units and multiple memories may form a computing resource pool or the like. Moreover, a quantity of resources in the resource pool shown in FIG. 1 is used as an example. During implementation, at least two resources may be included, for example, a memory resource pool may include at least two memories.

In the example shown in FIG. 1, in addition to a local memory (for example, a dynamic random access memory (DRAM) using a DDR interface), a CPU in the computer device also has a remote storage space allocated by a system. Each physical storage space is mapped to a global address space. A mapping relationship of the address space is stored in a driver of a cloud controller corresponding to each CPU. For example, a CPU 1 has a 10 GB local memory and a 100 GB remote storage resource (that is, storage spaces in the storage resource pool that are connected using a network and can be accessed) in total. Assuming that the CPU 1 can access a remote storage resource pool including a storage space A and a storage space B, and the storage space A and the storage space B each are a storage resource with a capacity of 50 GB, the CPU 1 can access a 110 GB storage space in total. The total storage space includes a storage space of 0 to 10 GB in the local memory and a storage space of 10 GB to 110 GB in the remote storage resource pool.

When the CPU 1 accesses the local memory, data can be accessed within a specified time because network transmission is not required. However, when data is not in the local memory, but in the remote storage resource pool, for example, in the storage space A or the storage space B, a cloud controller 1 can read the data only by accessing the remote storage resource pool using a network. Because network transmission is required, the cloud controller 1 cannot return the requested data to the CPU 1 at a DDR interface within a specified time. Therefore, after receiving a data read request delivered by the CPU 1, the cloud controller 1 packs the request, sends the request to the storage resource pool using the network, to obtain data, and returns an ECC error or a PAGE error to the CPU 1. When receiving error information from the cloud controller 1, the CPU 1 interrupts current memory access and suspends a corresponding access thread. After receiving the data sent from the storage resource pool, the cloud controller 1 generates an interrupt signal to notify the CPU 1. The CPU 1 can obtain, according to the received interrupt signal and by resending a memory reading request, the data that needs to be read. Because the data has been written into a storage space of the cloud controller 1 at this time, the CPU 1 can obtain the data at the DDR interface within a specified time. Therefore, when data that needs to be accessed by the CPU 1 is not inside the cloud controller 1, the CPU 1 needs to perform one interrupt operation and two read operations. As a result, a high access delay is caused, and overall performance of a system is affected because the CPU 1 cannot perform another operation during the interruption.

Figure 2:
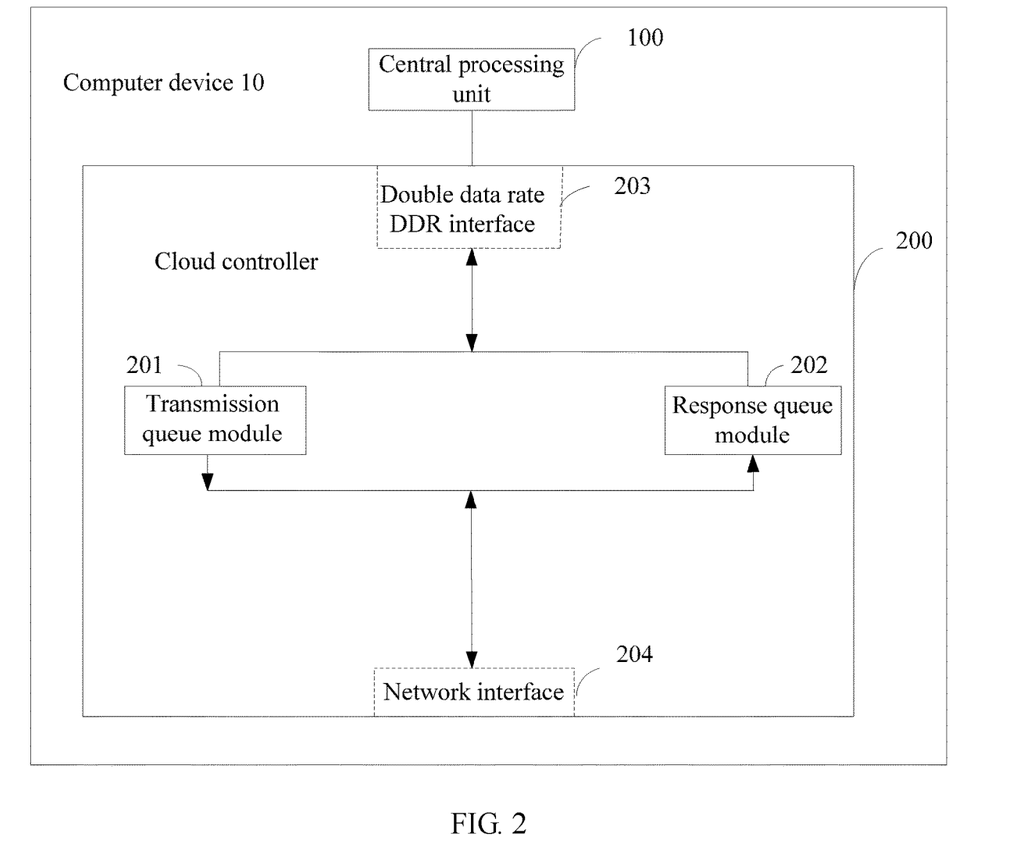
FIG. 2 is a simplified block diagram of a computer device according to an embodiment of the present application.

To resolve problems of an excessively high access delay and low system performance that are caused by a network delay when a CPU in the foregoing high-throughput computer data center accesses data that is not in a local resource, an embodiment of the present application provides a computer device 10. As shown in FIG. 2, the computer device 10 includes a central processing unit (CPU) 100 and a cloud controller 200. The cloud controller 200 includes a transmission queue module 201, a response queue module 202, a double data rate (DDR) interface 203, and a network interface 204. The DDR interface 203 is configured to connect the CPU 100 to the cloud controller 200, and the network interface 204 is configured to connect the cloud controller 200 to a network device.

The CPU 100 is configured to: after generating a request for performing a read or write operation on the network device, convert the read or write operation request into a control command, and write the control command into the transmission queue module 201. The control command instructs the cloud controller 200 to perform a read operation or a write operation on the network device, and the control command carries operation information of the read operation or the write operation.

The cloud controller 200 is configured to: when the control command in the transmission queue module 201 is triggered, perform the read operation or the write operation on the network device according to the operation information in the control command, receive a response message sent by the network device, and write the response message sent by the network device into the response queue module 202.

In this embodiment of the present application, the network device connected to the computer device 10 using the network interface 204 is a device connected to the computer device 10 using a network. When the CPU 100 needs to access data in the network device, the cloud controller 200 needs to send a data read or write message to the network device using the network, and receives a response message or data returned by the network device using the network. The CPU 100 is connected to the cloud controller 200 using the DDR interface 203, and an interrupt is avoided because the DDR interface 203 has a high data transmission rate. In addition, the CPU 100 converts a read or write operation request into a control command and writes the control command into the transmission queue module 201 of the cloud controller 200. Because the cloud controller 200 performs the read operation or the write operation on the network device according to operation information in the control command, after writing the control command into the transmission queue module 201, the CPU 100 does not need to wait for an operation performed by the cloud controller 200, and can continue to perform other service processing, for example, continue to write another control command. This avoids a waste of CPU 100 resources, and improves CPU 100 utilization and overall performance of the computer device.

During further implementation, the transmission queue module 201 and the response queue module 202 of the cloud controller 200 may be implemented by hardware such as a register or a memory, and are connected to the DDR interface and the like using a hardware interface. For example, the transmission queue module 201 stores, using hardware such as a register, a control command written by the CPU 100, and the response queue module 202 stores a response message using hardware such as a register. In addition, the transmission queue module 201 and the response queue module 202 store related commands or messages in an ordered arrangement manner such as in a queue form, such that the cloud controller 200 can read commands or write response messages in a queue form. In this embodiment of the present application, that the control command in the transmission queue module 201 is triggered may be that when the control command is written into the transmission queue module 201, the cloud controller 200 is triggered to extract the control command from the transmission queue module 201 and execute the control command. Further, a control unit or a control module of the cloud controller 200 may extract the control command from the transmission queue module 201 and execute the control command. The control unit or the control module of the cloud controller 200 is also a hardware control component, and is connected to the transmission queue module 201, the response queue module 202, or the network interface 204 using an interface.

Figure 3:
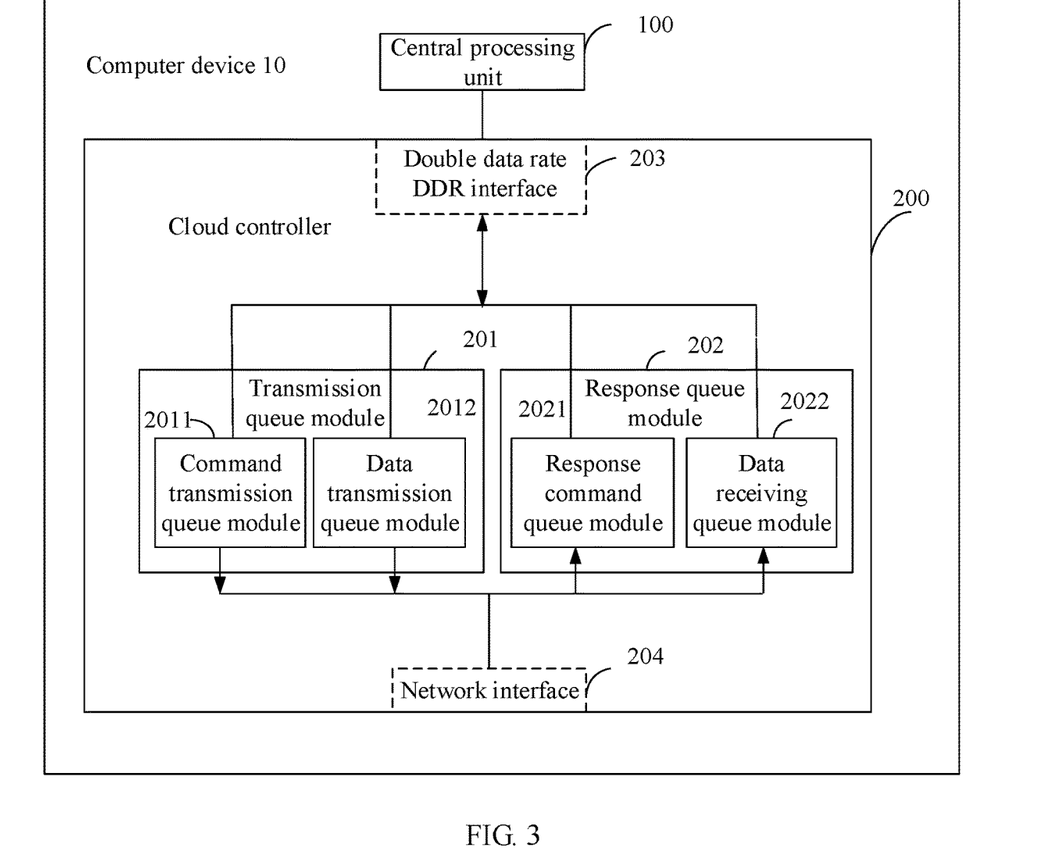
FIG. 3 is a schematic block diagram of a implementation of a computer device according to an embodiment of the present application.

When the read or write operation request is a read operation request, as shown in FIG. 3, the transmission queue module 201 includes a command transmission queue module 2011 and a data transmission queue module 2012;

the response queue module 202 includes a response command queue module 2021 and a data receiving queue module 2022;

the CPU 100 is further configured to: convert the read operation request into a read control command, and write the read control command into the command transmission queue module 2011, where the read control command carries read operation information and is used to instruct the cloud controller 200 to perform a read operation on the network device according to the read operation information; and the cloud controller 200 is further configured to: when the read control command in the command transmission queue module 2011 is triggered, perform the read operation on the network device according to the read operation information in the read control command, receive a read response message sent by the network device, write the read response message sent by the network device into the response command queue module 2021, and write, into the data receiving queue module 2022, data that is to be read by means of the read operation and that is returned by the network device.

Further, the converting the read operation request into a read control command, and writing the read control command into the command transmission queue module 2011 is implemented by a driver that runs in the CPU 100.

That the read control command in the command transmission queue module 2011 is triggered may be that when the read control command is written into the command transmission queue module 2011, the cloud controller is triggered to extract the read control command from the command transmission queue module 2011. During further implementation, a control unit or a control module of the cloud controller may extract the read control command from the the command transmission queue module 2011 when the read control command is written into the command transmission queue module 2011, and execute the read control command.

The read operation information may include an address, in the network device, of the data to be read by means of the read operation and a length of the data to be read by means of the read operation; or the read operation information includes a node address and an offset address, in the network device, of the data to be read by means of the read operation and a length of the data to be read by means of the read operation.

Optionally, the performing, by the cloud controller 200, the read operation on the network device according to the read operation information in the read control command may include: creating a communications packet using the address, in the network device, of the data to be read by means of the read operation and the length of the data to be read by means of the read operation, and sending the communications packet to the network device using a network; or creating, by the cloud controller 200, a communications packet using the node address and the offset address, in the network device, of the data to be read by means of the read operation and the length of the data to be read by means of the read operation, and sending the communications packet to the network device using a network. Further, the communications packet may be a PRAP data packet.

After converting the read operation request into the read control command and writing the read control command into the command transmission queue module 2011, the CPU 100 may perform another operation, for example, continue to write another read control command or write control command. The cloud controller 200 may extract the read control command from the command transmission queue module 2011 when the read control command is written into the command transmission queue module 2011, execute the read control command, write a result of executing the read control command into the response command queue module 2021, and when obtaining data that is read, write the read data into the data receiving queue module 2022. In this way, a read operation request is converted into two processes of writing a read control command by the CPU 100 and executing the read control command by the cloud controller 200. The CPU 100 can execute another task with no need to wait for a result of performing a read operation by the cloud controller 200, and only needs to obtain a read operation result when a read operation response command is written into the response command queue module 2021. This avoids an interrupt caused because the CPU 100 waits for a read operation result for an excessively long time, and improves resource utilization of the CPU 100 and overall performance of a system.

In this embodiment of the present application, the CPU 100 may obtain the read operation result by querying in a polling manner or by being notified by means of an interrupt. For example, after writing the read control command into the command transmission queue module, the CPU 100 queries, in a polling manner, whether the read response message sent by the network device exists in the response command queue module 2021, that is, repeatedly queries, according to a preset time interval, whether the read response message sent by the network device exists in the response command queue module 2021. When determining that the read response message sent by the network device exists in the response command queue module 2021, the CPU 100 obtains the response message in the response command queue module 2021. When the read response message is a read success response message, the CPU 100 reads, from the data receiving queue module 2022, the data to be read by means of the read operation.

The obtaining the read operation result by being notified by means of an interrupt includes: determining, by the cloud controller 200, whether the read response message sent by the network device exists in the response command queue module 2021, and notifying the CPU 100 by means of an interrupt when the read response message sent by the network device exists in the response command queue module 2021. Further, the response command queue module 2021 may notify the CPU 100 by means of an interrupt when the read response message is written into the response command queue module 2021.

The CPU 100 receives an interrupt message sent by the cloud controller 200, obtains the read response message from the response command queue module 2021 according to the interrupt message, and when the obtained read response message indicates a read success, reads, from the data receiving queue module 2022, the data to be read by means of the read operation.

During further implementation, the CPU 100 may write a polling-based query manner or an interrupt-based notification manner into a register of the cloud controller 200. The cloud controller 200 obtains, from the register, information written by the CPU 100. If the polling-based query manner is written into the register, the CPU 100 proactively queries, in a polling manner, the response command queue module 2021; if the interrupt-based notification manner is written into the register, the cloud controller 200 notifies the CPU 100 by means of an interrupt when the read response message is written into the response command queue module 2021.

When the read or write operation request is a write operation request, as shown in FIG. 3, the transmission queue module 201 includes a command transmission queue module 2011 and a data transmission queue module 2012;

the response queue module 202 includes a response command queue module 2021 and a data receiving queue module 2022;

the CPU 100 is further configured to: convert the write operation request into a write control command, write the write control command into the command transmission queue module 2011, and write, into the data transmission queue module 2012, data to be written by means of the write operation, where the write control command carries write operation information and is used to instruct the cloud controller 200 to write, into the network device according to the write operation information, the data to be written by means of the write operation; and the cloud controller 200 is further configured to: when the write control command in the command transmission queue module 2011 is triggered, extract, from the data transmission queue module 2012 according to the write operation information in the write control command, the data to be written by means of the write operation, and write, into the network device, the data to be written by means of the write operation; and when receiving a write response message sent by the network device, write the write response message sent by the network device into the response command queue module 2021.

Further, the converting the write operation request into a write control command and writing the write control command into the command transmission queue module 2011 is implemented by a driver that runs in the CPU 100.

That the write control command in the command transmission queue module 2011 is triggered may be that when the write control command is written into the command transmission queue module 2011, the cloud controller is triggered to extract the write control command from the command transmission queue module 2011. During further implementation, a control unit or a control module of the cloud controller may extract the write control command from the command transmission queue module 2011 when the write control command is written into the command transmission queue module 2011, and execute the read control command.

In a further implementation, the write operation information includes an address of the network device, a length of the data to be written by means of the write operation, and an address, in the data transmission queue module, of the data to be written by means of the write operation; or the write operation information includes a node address and an offset address of the network device, a length of the data to be written by means of the write operation, and an address, in the data transmission queue module, of the data to be written by means of the write operation.

Optionally, the extracting, by the cloud controller 200 from the data transmission queue module 2012 according to the write operation information in the write control command, the data to be written by means of the write operation, and writing, into the network device, the data to be written by means of the write operation may include: creating a communications packet using the data to be written by means of the write operation, the address of the network device, and the length of the data to be written by means of the write operation, and sending the communications packet to the network device using a network; or creating, by the cloud controller 200, a communications packet using the data to be written by means of the write operation, the node address and the offset address of the network device, and the length of the data to be written by means of the write operation, and sending the communications packet to the network device using a network. Further, the communications packet may be a PRAP data packet.

After converting the write operation request into the write control command and writing the write control command into the command transmission queue module 2011, the CPU 100 may perform another operation, for example, continue to write another read control command or write control command. The cloud controller 200 may extract the write control command from the command transmission queue module 2011 when the write control command is written into the command transmission queue module 2011, execute the write control command, and write a result of executing the write control command into the response command queue module 2021. In this way, a write operation request is converted into two processes of writing a write control command into the command transmission queue module 2011 of the cloud controller and executing the write control command by the cloud controller 200. The CPU 100 can execute another task with no need to wait for a result of performing a write operation by the cloud controller 200, and only needs to obtain a write operation result when a write operation response command is written into the response command queue module 2021. This avoids an interrupt caused because the CPU 100 waits for a write operation result for an excessively long time, and improves resource utilization of the CPU 100 and overall performance of the computer device.

In this embodiment of the present application, the CPU 100 may further obtain the write operation result by querying in a polling manner or by being notified by means of an interrupt. For example, after writing the write control command into the command transmission queue module, the CPU 100 queries, in a polling manner, whether the write response message sent by the network device exists in the response command queue module 2021, that is, repeatedly queries, according to a preset time interval, whether the write response message sent by the network device exists in the response command queue module 2021. When determining that the write response message sent by the network device exists in the response command queue module 2021, the CPU 100 obtains the write response message.

The obtaining the write operation result by being notified by means of an interrupt includes: determining, by the cloud controller 200, whether the write response message sent by the network device exists in the response command queue module 2021, and notifying the CPU 100 by means of an interrupt when the write response message sent by the network device exists in the response command queue module 2021. Further, the cloud controller 200 may notify the CPU 100 by means of an interrupt when the write response message is written into the response command queue module 2021. The CPU 100 is further configured to: receive an interrupt message sent by the cloud controller 200, and obtain the write response message from the response command queue module 2021 according to the interrupt message.

In the foregoing embodiment, the command transmission queue module 2011, the data transmission queue module 2012, the response command queue module 2021, and the data receiving queue module 2022 may be implemented by hardware such as a register or a memory, and are connected to the DDR interface or the like using a hardware interface. In addition, the command transmission queue module 2011 and the response command queue module 2021 store related commands or messages in an ordered arrangement manner such as in a queue form, and the data transmission queue module 2012 and the data receiving queue module 2022 store related data in an ordered arrangement manner such as in a queue form, such that the cloud controller 200 can perform reading or writing in a queue form. Further, a control unit or a control module of the cloud controller 200 may extract a control command from the command transmission queue module 2011 or the response command queue module 2021, execute the control command, and read data from the data transmission queue module 2012 or write data into the data receiving queue module 2022. The control unit or the control module of the cloud controller 200 is also a hardware control component, and is connected to the command transmission queue module 2011, the data transmission queue module 2012, the response command queue module 2021, the data receiving queue module 2022, and the network interface 204 using interfaces.

In an optional implementation, the computer device 10 further includes a memory, and the CPU 100 obtains to-be-read data from the data receiving queue module 2022 and writes the to-be-read data into the memory. For example, the to-be-read data may be written into the memory in a direct memory access (DMA) manner. The writing, by the CPU 100 into the data transmission queue module 2012, the data to be written by means of the write operation is writing, into the data transmission queue module 2012 by configuring a DMA controller of a memory controller (MC), the data in the memory that is to be written by means of the write operation.

In this embodiment of the present application, the network device is a device connected to the computer device using a network, and includes a device that provides a storage resource or a device that provides an input/output resource. Optionally, the device that provides a storage resource includes a device that provides a memory resource.

The computer device 10 in the foregoing embodiment may be applied to a high-throughput computer data center, and is used as a high-throughput computer for data processing. When the computer device 10 is used as a high-throughput computer for data processing, the computer device 10 may include at least two CPUs and at least two memories. The at least two CPUs form a CPU resource pool and separately process data in the high-throughput computer data center.

It should be noted that the DDR interface in the foregoing embodiment is a quick interface for reading or writing data between a CPU and a memory currently. To quickly read or write data, the DDR is used between the CPU 100 and the cloud controller 200, so as to meet a requirement of quickly obtaining data by the CPU. However, in this embodiment of the present application, no limitation is imposed on a form of an interface used between a CPU and a cloud controller. Another interface that can be used for quickly reading or writing data and that can meet a requirement of quickly reading or writing data by a CPU, for example, an interface whose reading or writing rate is equal to or similar to a reading or writing rate between a CPU and a memory, can be used as an interface between the CPU and the cloud controller.

Figure 4:
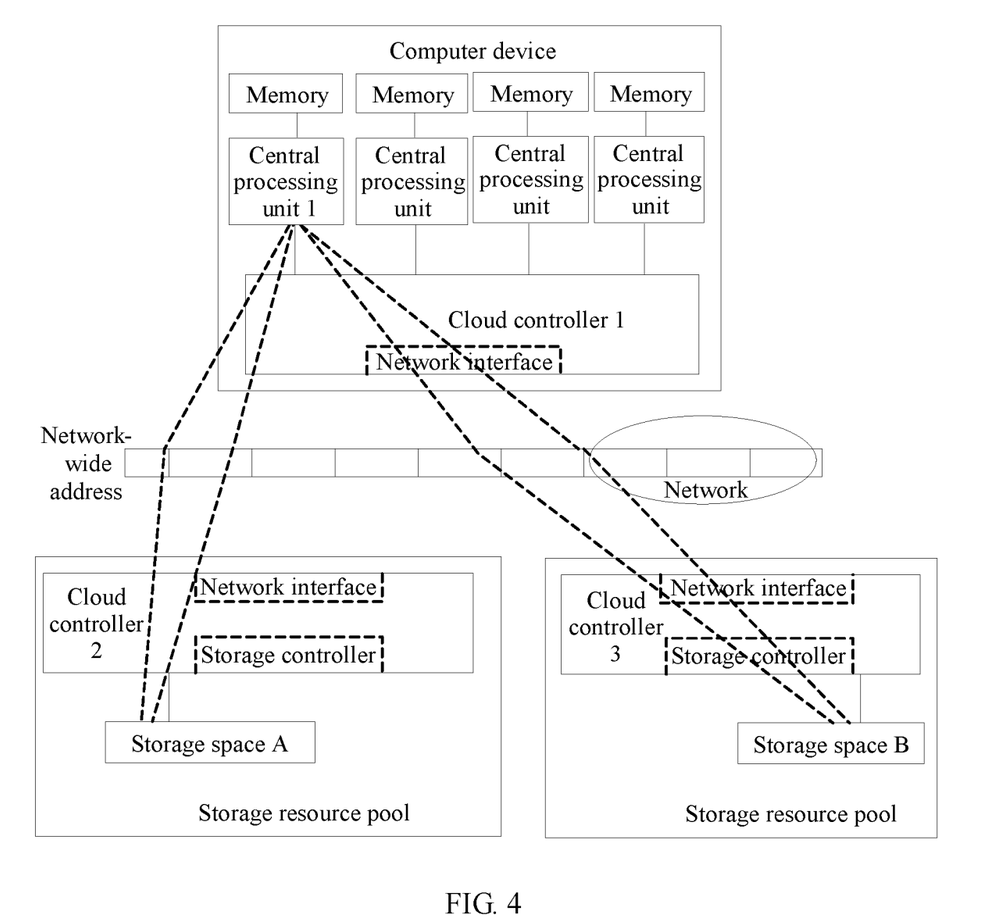
FIG. 4 is a schematic diagram of reading or writing remote data by a computer device according to an embodiment of the present application.

The following uses an example to describe a schematic diagram of a manner of reading or writing remote data by a computer device according to an embodiment of the present application. As shown in FIG. 4, in addition to a local memory (for example, a DRAM using a DDR interface), a CPU 1 in a CPU resource pool also has remote storage spaces (a storage space A and a storage space B) allocated by a system. Each physical storage space is mapped to a global address space. A mapping relationship of the address space is stored in a driver of a cloud controller corresponding to each CPU. In this embodiment, descriptions are provided using an example in which the remote storage spaces include only the storage space A and the storage space B. During further implementation, two or more storage spaces may be included. For example, the CPU 1 has a 10 GB local memory and a 100 GB remote storage resource in total. The CPU 1 can access a remote storage resource pool including the storage space A and the storage space B, and the storage space A and the storage space B each are a storage space with a capacity of 50 GB. In this case, the CPU 1 can access a 110 GB storage space in total: a storage space of 0 to 10 GB in the local memory and a storage space of 10 GB to 110 GB in the remote storage resource pool.

When the CPU 1 accesses the local memory, if an address space of 0 GB to 10 GB is accessed, the address space is mapped to the local memory, and the local memory is accessed using the DDR interface.

When the CPU 1 accesses an address space of 10 GB to 110 GB, for example, 1 MB data needs to be written into the address space of 10 GB to 110 GB, the following steps are included:

Step 1: A driver of the CPU 1 first writes, into a data transmission queue module of a cloud controller 1, the 1 MB data that needs to be written. It is assumed that the data is stored in an address of 5 KB in the data transmission queue module.

Step 2: The driver of the CPU 1 obtains an address, in the storage resource pool, into which the 1 MB data to be written. Assuming that the address is the $100^{th}$ GB address, the address is mapped to an address of 40 GB in the storage space B. Because an address range mapped to the storage space A is 10 GB to 60 GB, an address range mapped to the storage space B is 60 GB to 110 GB.

Step 3: The driver of the CPU 1 writes, into a command transmission queue module of the cloud controller 1, address information of the remote storage space B, an offset address of 40 GB of the storage space B, an address of 5 KB in a data transmission queue, information of a data length of 1 MB, an identifier ID (for example, 0x01) of a current command, and other information. The driver of the CPU 1 may write the command into the command transmission queue module of the cloud controller 1 by writing the command into a particular register.

Step 4: The cloud controller 1 obtains a new command (that is, the command of writing 1 MB data) from the command transmission queue module after finding that the command transmission queue module is not empty, parses the command to obtain the address of the remote storage space B, the offset address of the storage space B, the command identifier ID, and the data length, and other information, obtains corresponding data from the data transmission queue module according to the address, in the data transmission queue module, of the 1 MB data in the command transmission queue module to create a communications packet, and sends the communications packet to the storage space B using a network. In this case, if the CPU 1 needs to further perform another write operation, the driver of the CPU 1 may repeatedly perform the foregoing steps, and continue to write corresponding data and a corresponding command into the cloud controller 1.

Step 5: After the 1 MB data is written into the storage space B, return a packet (carrying the corresponding command identifier ID: 0x01) indicating that data writing is complete. After the cloud controller 1 of the CPU 1 receives the returned packet, the cloud controller 1 of the CPU 1 writes information that a write command is complete into the response command queue module. The driver of the CPU 1 obtains, by querying the response command queue module, a write complete operation in which an identifier is 0x01, or the response command queue module notifies, by means of an interrupt, the CPU 1 that the write complete operation in which an identifier is 0x01 has been received, and the CPU 1 learns that the write operation of writing 1 MB data in the $100^{th}$ GB address is complete.

When the CPU 1 accesses an address space of 10 GB to 110 GB, for example, 1 MB data needs to be read from the address space of 10 GB to 110 GB, the following steps are included:

Step 1: The driver of the CPU 1 obtains an address of to-be-read data in the storage resource pool. Assuming that the address is an address of 100 GB, the address is mapped to an address of 40 GB on a node B.

Step 2: The driver of the CPU 1 writes, into the command transmission queue module of the cloud controller 1, address information of the storage space B, an offset address of 40 GB of the to-be-read data in the storage space B, information of a data length of 1 MB, an identifier ID (for example, 0x02) of a current command, and other information. The driver of the CPU 1 may write, by writing a command of reading the 1 MB data into a particular register, the command of reading the 1 MB data into the command transmission queue module of the cloud controller 1.

Step 3: After finding that a command transmission queue is not empty, the cloud controller 1 obtains, from the command transmission queue module, the command of reading the 1 MB data, parses the command to obtain the address information of the remote storage space B, the offset address of the 1 MB data in the storage space B, the command identifier ID, the data length, and other information to create a communications packet, and sends the communications packet to the storage space B using a network. If the CPU 1 needs to further perform another read or write operation, the CPU 1 may repeatedly perform the foregoing steps, but different command identifiers need to be used to represent different commands.

Step 4: After reading the corresponding data from the remote storage space B, the cloud controller 1 stores the returned data in the data receiving queue module, and writes, into the response command queue module, a command identifier ID 0x02, address information (10 KB) in a data receiving queue, a data length of 1 MB, and other information.

Step 5: The driver of the CPU 1 may query, in a polling manner, a status of the response command queue module, or the response command queue module notifies the CPU 1 by means of an interrupt, and the driver of the CPU 1 learns, by reading the response command queue module, a response message of the reading the 1 MB data. When the response message indicates a read success, the 1 MB data is read from the data receiving queue module according to information, in the data receiving queue module, about the read data and is written into the local memory, or is read by means of DMA by configuring a DMA controller of the CPU.

The further implementation is described using a network device for storing a resource as an example. The computer device provided in this embodiment of the present application may read data from a device that provides an input/output resource or write data into a device that provides an input/output resource. In this case, the network device is the device that provides the input/output resource.

Figure 5:
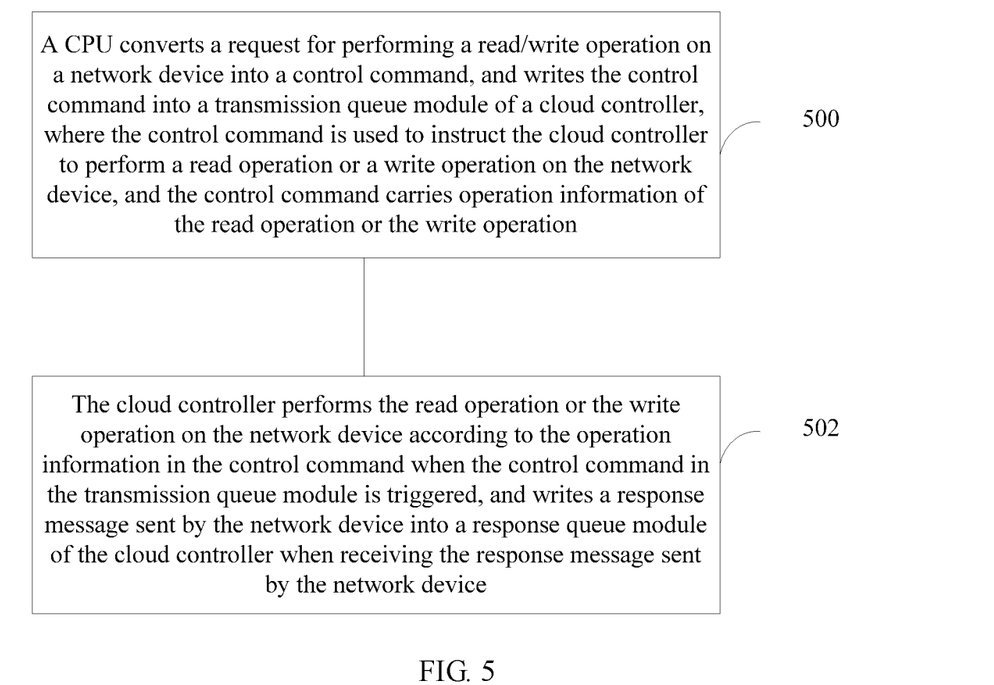
FIG. 5 is a flowchart of a method for reading or writing data by a computer device according to an embodiment of the present application.

An embodiment of the present application further provides a method for reading or writing data by a computer device. The computer device includes a central processing unit (CPU), a cloud controller, and a network interface. The CPU is connected to the cloud controller using a double data rate (DDR) interface, and the network interface is configured to connect the cloud controller to a network device. FIG. 5 is a schematic flowchart of a method for reading or writing data by a computer device according to an embodiment of the present application. The method includes the following steps:

Step 500: The CPU converts a request for performing a read or write operation on the network device into a control command, and writes the control command into a transmission queue module of the cloud controller, where the control command is used to instruct the cloud controller to perform a read operation or a write operation on the network device, and the control command carries operation information of the read operation or the write operation.

Step 502: The cloud controller performs the read operation or the write operation on the network device according to the operation information in the control command when the control command in the transmission queue module is triggered, and writes a response message sent by the network device into a response queue module of the cloud controller when receiving the response message sent by the network device.

According to the foregoing method embodiment, the CPU is connected to the cloud controller using the DDR interface, and an interrupt is avoided because the DDR interface has a high data transmission rate. In addition, the CPU converts a read or write operation request into a control command and writes the control command into the transmission queue module of the cloud controller. Because the cloud controller performs the read operation or the write operation on the network device according to operation information in the control command, after writing the control command into the transmission queue module, the CPU does not need to wait for an operation performed by the cloud controller and can continue to perform other service processing, for example, continue to write another control command. This avoids a waste of CPU resources, and improves CPU utilization.

During further implementation, if the read or write operation request is a read operation request, the converting, by the CPU, a request for performing a read or write operation on the network device into a control command, and writing the control command into a transmission queue module of the cloud controller includes:

converting, by the CPU, the read operation request into a read control command, and writing the read control command into a command transmission queue module of the transmission queue module, where the read control command carries read operation information and is used to instruct the cloud controller to perform a read operation on the network device according to the read operation information; and the performing, by the cloud controller, the read operation or the write operation on the network device according to the operation information in the control command, and writing a response message sent by the network device into a response queue module of the cloud controller when receiving the response message sent by the network device includes:

performing, by the cloud controller, the read operation on the network device according to the read operation information in the read control command when the read control command in the command transmission queue module is triggered, receiving a read response message sent by the network device, writing the read response message sent by the network device into the response command queue module of the response queue module, and writing, into the data receiving queue module of the response queue module, data that is to be read by means of the read operation and that is returned by the network device.

The read operation information may include an address, in the network device, of the data to be read by means of the read operation and a length of the data to be read by means of the read operation; or the read operation information includes a node address and an offset address, in the network device, of the data to be read by means of the read operation and a length of the data to be read by means of the read operation.

After converting the read operation request into the read control command and writing the read control command into the command transmission queue module, the CPU may perform another operation, for example, continue to write another read control command or write control command. The cloud controller may extract the read control command from the command transmission queue module when the read control command is written into the command transmission queue module, execute the read control command, write a result of executing the read control command into the response command queue module, and write read data into the data receiving queue module when obtaining the read data. In this way, a read operation request is converted into two processes of writing a read control command by a CPU and executing the read control command by the cloud controller. The CPU can execute another task with no need to wait for a result of performing a read operation by the cloud controller, and only needs to obtain a read operation result when a read operation response command is written into the response command queue module. This avoids an interrupt caused because the CPU waits for a read operation result for an excessively long time, and improves resource utilization of the CPU.

Further, in this embodiment of the present application, the CPU may obtain the read operation result by querying in a polling manner or by being notified by means of an interrupt.

When obtaining the read operation result by querying in a polling manner, the CPU queries, in a polling manner, after writing the read control command into the command transmission queue module, whether the read response message sent by the network device exists in the response command queue module, that is, repeatedly queries, according to a preset time interval, whether the read response message sent by the network device exists in the response command queue module. When determining that the read response message sent by the network device exists in the response command queue module and the read response message is a read success response message, the CPU reads, from the data receiving queue module, data to be read by means of the read operation.

When obtaining the read operation result by being notified by means of an interrupt, the cloud controller determines whether the read response message sent by the network device exists in the response command queue module, and notifies the CPU by means of an interrupt when the read response message sent by the network device exists in the response command queue module. The CPU receives an interrupt message sent by the cloud controller, obtains the read response message from the response command queue module according to the interrupt message, and when the obtained read response message indicates a read success, reads, from the data receiving queue module, the data to be read by means of the read operation.

When the read or write operation request is a write operation request, the converting, by the CPU, a request for performing a read or write operation on the network device into a control command, and writing the control command into a transmission queue module of the cloud controller includes:

converting, by the CPU, the write operation request into a write control command, writing the write control command into the command transmission queue module of the transmission queue module, and writing, into the data transmission queue module of the transmission queue module, data to be written by means of the write operation, where the write control command carries write operation information and is used to instruct the cloud controller to write, into the network device according to the write operation information, the data to be written by means of the write operation; and the performing, by the cloud controller, the read operation or the write operation on the network device according to the operation information in the control command, and writing a response message sent by the network device into a response queue module of the cloud controller when receiving the response message sent by the network device includes:

when the write control command in the command transmission queue module is triggered, extracting, by the cloud controller from the data transmission queue module according to the write operation information in the write control command, the data to be written by means of the write operation, and writing, into the network device, the data to be written by means of the write operation; and when receiving a write response message sent by the network device, writing the write response message sent by the network device into the response command queue module of the response queue module.

The write operation information may include an address of the network device, a length of the data to be written by means of the write operation, and an address, in the data transmission queue module, of the data to be written by means of the write operation; or the write operation information includes a node address and an offset address of the network device, a length of the data to be written by means of the write operation, and an address, in the data transmission queue module, of the data to be written by means of the write operation.

After converting the write operation request into the write control command and writing the write control command into the command transmission queue module, the CPU may perform another operation, for example, continue to write another read control command or write control command. The cloud controller may extract the write control command from the command transmission queue module when the write control command is written into the command transmission queue module, execute the write control command, and write a result of executing the write control command into the response command queue module. In this way, a write operation request is converted into two processes of writing a write control command into the command transmission queue module of the cloud controller and executing the write control command by the cloud controller. The CPU can execute another task with no need to wait for a result of performing a write operation by the cloud controller, and only needs to obtain a write operation result when a write operation response command is written into the response command queue module. This avoids an interrupt caused because the CPU waits for a write operation result for an excessively long time, and improves resource utilization of the CPU.

Further, in this embodiment of the present application, the CPU may obtain the write operation result by querying in a polling manner or by being notified by means of an interrupt.

When obtaining the write operation result by querying in a polling manner, the CPU queries, in a polling manner, after writing the write control command into the command transmission queue module, whether the write response message sent by the network device exists in the response command queue module, and the CPU obtains the write response message when determining that the write response message sent by the network device exists in the response command queue module.

When obtaining the write operation result by being notified by means of an interrupt, the cloud controller determines whether the write response message sent by the network device exists in the response command queue module, and notifies the CPU by means of an interrupt when the write response message sent by the network device exists in the response command queue module. The CPU receives an interrupt message sent by the cloud controller, and obtains the write response message from the response command queue module according to the interrupt message.

The implementation of the foregoing method embodiment may also be implemented with reference to the implementations of the computer device 10, and no details are repeated.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A computer device, comprising a central processing unit (CPU) and a cloud controller;
   wherein the cloud controller comprises:
      a memory storing a transmission queue and a response queue;
      a double data rate (DDR) interface connecting the CPU to the cloud controller; and
      a network interface connecting the cloud controller to a network device; and,
   wherein the CPU is configured to:
      convert a request to perform an operation on the network device into a control command; and
      write, through the DDR interface, the control command into the transmission queue in the cloud controller, wherein the control command instructs the cloud controller to perform the operation on the network device, and the control command carries operation information of the operation; and, wherein
   the cloud controller is configured to:
      perform the operation on the network device according to the operation information in the control command when the control command in the transmission queue is triggered;
      receive a response from the network device; and
      write the response into the response queue; and
      the CPU is configured to be able to execute another task before receiving the response from the response queue.

2. The computer device according to claim 1, wherein the transmission queue comprises a command transmission queue and a data transmission queue, and the response queue comprises a response command queue and a data receiving queue;
   wherein when the request to perform an operation on the network device is a request to read data from the network device, the CPU is configured to:
   convert the request to read data from the network device into a read control command; and
   write the read control command into the command transmission queue, wherein the read control command carries read operation information and instructs the cloud controller to read data from the network device according to the read operation information;
   and the cloud controller is configured to:
      send a read request to the network device according to the read operation information when the read control command in the command transmission queue is triggered;
      receive a read response and data from the network device;
      write the read response from the network device into the response command queue; and
      write the data received from the network device into the data receiving queue.

3. The computer device according to claim 2, wherein the read operation information comprises an address, in the network device, of the data to be read and a length of the data to be read.

4. The computer device according to claim 2, wherein the read operation information comprises a node address and an offset address, in the network device, of the data to be read and a length of the data to be read.

5. The computer device according to claim 2, wherein the CPU is further configured to:
  after writing the read control command into the command transmission queue, query, in a polling manner, whether the read response from the network device exists in the response command queue; and
  read, from the data receiving queue, the data received from the network device when it is determined that the read response from the network device exists in the response command queue and the read response is a read success response.

6. The computer device according to claim 2, wherein the cloud controller is further configured to:
  notify the CPU by way of an interrupt after the read response from the network device is written in the response command queue;
  and wherein the CPU is further configured to:
    obtain the read response from the response command queue according to the interrupt; and
    read, from the data receiving queue, the data received from the network device when the read response indicates a read success.

7. The computer device according to claim 1, wherein the transmission queue comprises a command transmission queue and a data transmission queue, and the response queue comprises a response command queue and a data receiving queue;
  wherein when the request to perform an operation on the network device is a request to write data to the network device, the CPU is configured to:
    convert the request to write data to the network device into a write control command;
    write the write control command into the command transmission queue; and
    write data to be written to the network device into the data transmission queue, wherein the write control command carries write operation information and instructs the cloud controller to write the data to the network device according to the write operation information;
  and the cloud controller is configured to:
    extract, from the data transmission queue according to the write operation information in the write control command when the write control command in the command transmission queue is triggered, the data to be written to the network device;
    send the data to the network device for writing the data into the network device according to the write operation information;
    receiving a write response from the network device; and
    write the write response from the network device into the response command queue.

8. The computer device according to claim 7, wherein the write operation information comprises an address of the network device, a length of the data to be written, and an address, in the data transmission queue, of the data to be written.

9. The computer device according to claim 7, wherein the write operation information comprises a node address and an offset address of the network device, a length of the data to be written, and an address, in the data transmission queue, of the data to be written.

10. The computer device according to claim 7, wherein the CPU is further configured to:
  after writing the write control command into the command transmission queue, query, in a polling manner, whether the write response from the network device exists in the response command queue; and
  obtain the write response when it is determined that the write response from the network device exists in the response command queue.

11. The computer device according to claim 7, wherein the cloud controller is further configured to:
  notify the CPU by way of an interrupt after the write response from the network device is written in the response command queue;
  and wherein the CPU is further configured to:
    obtain the write response from the response command queue according to the interrupt.

12. A method for use by a computer device, wherein the computer device comprises a central processing unit (CPU) and a cloud controller, the cloud controller comprises a double data rate (DDR) interface connecting the CPU to the cloud controller, and a network interface connecting the cloud controller to a network device; wherein the method comprises:
  converting, by the CPU, a request to perform an operation on the network device into a control command;
  writing through the DDR interface, by the CPU, the control command into a transmission queue in the cloud controller so that the CPU is able to execute another task before receiving a response from a response queue, wherein the control command instructs the cloud controller to perform the operation on the network device, and the control command carries operation information of the operation;
  performing, by the cloud controller, the operation on the network device according to the operation information in the control command when the control command in the transmission queue is triggered;
  receiving, by the cloud controller, the response from the network device; and
  writing, by the cloud controller, response into the response queue in the cloud controller.

13. The method according to claim 12, wherein the transmission queue comprises a command transmission queue and a data transmission queue, and the response queue comprises a response command queue and a data receiving queue;
  wherein when the request to perform an operation on the network device is a request to read data from the network device, the method comprises:
    converting, by the CPU, the request to dear data from the network device into a read control command; and
    writing, by the CPU, the read control command into the transmission queue, wherein the read control command carries read operation information and instructs the cloud controller to read data from the network device according to the read operation information;
    sending, by the cloud controller, a read request to the network device according to the read operation information when the read control command in the command transmission queue is triggered;
    receiving, by the cloud controller, a read response and data from the network device;
    writing, by the cloud controller, the read response from the network device into the response command queue; and
    writing, by the cloud controller, the data received from the network device into the data receiving queue.

14. The method according to claim 13, wherein
the read operation information comprises an address, in the network device, of the data to be read; or
the read operation information comprises a node address and an offset address, in the network device, of the data to be read.

15. The method according to claim 13, further comprising:
after writing the read control command into the command transmission queue, querying, by the CPU in a polling manner, whether the read response from the network device exists in the response command queue; and
reading, by the CPU from the data receiving queue, the data received from the network device when it is determined that the read response from the network device exists in the response command queue and the read response is a read success response.

16. The method according to claim 13, further comprising:
notifying, by the cloud controller, the CPU by way of an interrupt after the read response from the network device is written in the response command queue;
obtaining, by the CPU, the read response from the response command queue according to the interrupt; and
reading, by the CPU from the data receiving queue, the data received from the network device when the read response indicates a read success.

17. The method according to claim 12, wherein the transmission queue comprises a command transmission queue and a data transmission queue, and the response queue comprises a response command queue and a data receiving queue;
wherein when the request to perform an operation on the network device is a request to write data to the network device, the method comprises:
converting, by the CPU, the request to write data to the network device into a write control command;
writing, by the CPU, the write control command into the transmission queue;
writing, by the CPU, data to be written to the network device into the data transmission queue, wherein the write control command carries write operation information and instructs the cloud controller to write the data to the network device according to the write operation information;
extracting, by the cloud controller from the data transmission queue according to the write operation information in the write control command, the data to be written to the network device, when the write control command in the command transmission queue is triggered;
sending, by the cloud controller, the data to the network device for writing the data into the network device according to the write operation information;
receiving, by the cloud controller, a write response from the network device; and
writing, by the cloud controller, the write response from the network device into the response command queue.

18. The method according to claim 17, wherein
the write operation information comprises an address of the network device, a length of the data to be written, and an address, in the data transmission queue, of the data to be written; or
the write operation information comprises a node address and an offset address of the network device, a length of the data to be written, and an address, in the data transmission queue, of the data to be written.

19. The method according to claim 17, further comprising:
after writing the write control command into the command transmission queue, querying, by the CPU in a polling manner, whether the write response from the network device exists in the response command queue; and
obtaining, by the CPU, the write response when it is determined that the write response from the network device exists in the response command queue.

20. The method according to claim 17, further comprising:
notifying, by the could controller, the CPU by way of an interrupt after the write response from the network device is written in the response command queue; and
obtaining, by the CPU, the write response from the response command queue according to the interrupt.

* * * * *